(12) United States Patent
Jha et al.

(10) Patent No.: US 12,430,257 B2
(45) Date of Patent: Sep. 30, 2025

(54) SMART CACHE CLEANER

(71) Applicant: Advanced Micro Devices, Inc., Santa Clara, CA (US)

(72) Inventors: Dilip Kumar Jha, Hyderabad (IN); William Louie Walker, Fort Collins, CO (US); Durgesh Kumar, Hyderabad (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 6 days.

(21) Appl. No.: 18/543,352

(22) Filed: Dec. 18, 2023

(65) Prior Publication Data

US 2025/0199960 A1     Jun. 19, 2025

(51) Int. Cl.
*G06F 12/0891* (2016.01)
*G06F 12/0817* (2016.01)

(52) U.S. Cl.
CPC ...... *G06F 12/0891* (2013.01); *G06F 12/0822* (2013.01)

(58) Field of Classification Search
CPC .......... G06F 12/0822; G06F 12/0891
See application file for complete search history.

(56) References Cited

U.S. PATENT DOCUMENTS

| | | | |
|---|---|---|---|
| 7,062,675 B1* | 6/2006 | Kemeny | G06F 11/1441 711/138 |
| 9,946,646 B2 | 4/2018 | Walker | |
| 10,289,567 B2 | 5/2019 | Walker | |
| 11,860,781 B1* | 1/2024 | Raz | G06F 3/0604 |
| 2005/0172082 A1* | 8/2005 | Liu | G06F 12/0866 711/3 |
| 2017/0010965 A1* | 1/2017 | Hsu | G06F 12/0806 |
| 2017/0212840 A1* | 7/2017 | Le | G06F 12/121 |
| 2021/0240631 A1* | 8/2021 | Joo | G06F 12/0811 |
| 2023/0094030 A1 | 3/2023 | Jha et al. | |

* cited by examiner

*Primary Examiner* — Aracelis Ruiz
(74) *Attorney, Agent, or Firm* — FIG. 1 Patents (57) ABSTRACT

A cache cleaner controller is described. In one or more examples, an apparatus includes a cache directory including status bits associated with cache locations within cache storage and a cache cleaner controller. The cache cleaner controller is configured to detect that a cache cleaner threshold has been reached. The cache cleaner threshold defines that a threshold number of the status bits indicate data maintained at the cache locations, respectively, has been changed. The cache cleaner controller is also configured to cause the data indicated as changed by the status bits to be copied from the cache locations within cache storage to the physical volatile memory.

20 Claims, 5 Drawing Sheets

SMART CACHE CLEANER

BACKGROUND

Processor units, such as central processor units, parallel processors, graphics processor units, and so forth are tasked with processing ever-increasing amounts of data. Access to this data is a significant factor in speed, at which, the processor unit is able to process the data. To address this, cache systems are employed to speed this access. Conventional techniques used to implement cache systems, however, are confronted with a variety of challenges including latency, throughput, tradeoffs between size and speed, and so forth. These challenges and conventional techniques used to address these challenges have hindered operation of the processor units in conventional real-world scenarios as well as operations that are affected by these challenges.

BRIEF DESCRIPTION OF THE DRAWINGS

The detailed description is described with reference to the accompanying figures.

DETAILED DESCRIPTION

Overview

Efficiency of data access by a processor unit has a significant effect on the speed and operation of the processor unit and devices that depend on the processor unit as a whole. Efficiencies gained in providing this access function to improve speed of operation of the processor units, reduce power consumption, conserve bandwidth, and support a variety of other technical advantages in utilization of the processor units and associated devices. One of the techniques used to speed data access involves inclusion of a cache system as part of the processor unit. In an example, a processor unit is implemented in hardware, e.g., as a central processing unit, graphics processing unit, parallel processor, and so forth. The processor unit is configurable to include a plurality of cores as well as a cache system to implement data caching techniques.

A core, for instance, is implemented in hardware (e.g., as part of an integrated circuit) along with a cache system "on die" (e.g., also in hardware as part of the integrated circuit) that includes a cache controller and cache storage. Configuration and implementation of the cache system leverages a variety of locality factors. Spatial locality is used to improve operation in situations in which data is requested that is stored physically close to data that is a subject of a previous request. Temporal locality is used to address scenarios in which data that has already been requested will be requested again.

During operation of the cache system, a cache controller maintains a cache directory including cache directory entries. The cache directory entries specify cache locations in the cache storage and status bits indicating respective status of data maintained at the cache locations. The cache locations, for instance, correspond to memory locations in physical volatile memory, e.g., dynamic random access memory (DRAM). The status bits indicate whether data maintained at the cache locations in the cache storage have been changed and thus no longer correspond (e.g., no longer match) to data maintained at the physical volatile memory. The status bits are also referred to as "dirty bits" indicating whether the data at the cache location is "dirty" as being changed or "clean" as being unchanged with respect to corresponding data in the physical volatile memory. By setting a status bit as "dirty," the data from the cache location of the cache storage is to be copied to a corresponding memory location in the physical volatile memory to maintain coherency of the data. Status bits set as "clean" indicate a match between the data at the cache location in cache storage and data maintained at a corresponding memory address in physical volatile memory, i.e., the data is unchanged.

In order to conserve power, the processor unit is configurable to enter a "low power mode" in which portions of the processor unit are powered down to reduce power consumption. In order to enter the low power mode, in some scenarios, the cache system is also powered down, which involves "flushing" data having status bits that are marked as "dirty" from the cache storage to the physical volatile memory to ensure that the data maintained in the physical volatile memory is accurate. In real world scenarios, however, flushing of the cache storage introduces latency in entering the low power mode. This latency is caused by an amount of time and resources utilized by the cache controller in copying over the "dirty" data from the cache storage to the physical volatile memory. Latency caused by the transmission and copying of the data increases latency to enter low power state and therefor reduces low power residency and overall power efficiency.

To address these technical challenges, a smart cache cleaner is implemented by a cache cleaner controller as part of the cache system (e.g., as also part of an integrated circuit in hardware of the processor unit) to reduce an amount of data that is to be a subject of a flush of cache storage to physical volatile memory. The cache cleaner controller, for instance, is configurable to reduce an amount of cache locations that are indicated as "dirty" by respective status bits at any one time. Accordingly, when an input is received to enter a low power mode, latency is reduced in entering the low power mode by reducing an amount of data to be transmitted from cache storage to physical volatile memory at that time.

To do so, the cache cleaner controller is configured to leverage a cache cleaner counter, a cache cleaner threshold, and a cache cleaner interval. The cache cleaner counter is configurable to track a number of status bits that are indicated as "dirty," e.g., correspond to cache locations having data that has been changed as compared to corresponding data maintained by the physical volatile memory.

The cache cleaner threshold is configurable to specify a threshold number of status bits that, when indicated as "dirty," cause the cache cleaner controller to implement cache coherency techniques to cause data indicated by corresponding status bits as "dirty" to be copied from corresponding cache locations to physical volatile memory. The data, once copied over to the volatile physical memory, is no longer considered "dirty." Accordingly, the cache cleaner controller is also configurable to reset the status bits as "clean" and the data, as clean, still remains accessible in the cache storage for subsequent processing. In this way, an amount of data that is considered "dirty" within the cache storage is reduced, e.g., is controlled by the cache cleaner controller to be less than an amount corresponding to the cache cleaner threshold. Therefore, operations that are dependent on this amount of data (e.g., to enter a low power mode as described above) are performable with decreased latency and function to reduce power consumption by "cleaning" the "dirty" status bits by the cache cleaner controller.

Similarly, the cache cleaner interval is configured to specify an amount of time usable by the cache cleaner controller to cause the data maintained in the cache storage to be coherent (e.g., match) with data maintained in the physical volatile memory. The cache cleaner controller, in one or more examples, is operable to cause data corresponding to status bits that are marked as "dirty" to be transmitted to the physical volatile memory at intervals of time defined by the cache cleaner interval. Thus, the cache cleaner interval is usable in this example as a standalone criterion to control when to transmit the dirty data, which may then be marked as "clean" by the status bit. As a result, the data is still accessible via the cache storage and thus supports efficiencies supported by the cache as described above as well as reduces latency of operations when confronted with data transmission caused by data indicated as "dirty," e.g., to enter a low power mode.

The cache cleaner threshold and cache cleaner interval are also usable in conjunction. The cache cleaner controller, for instance, is configurable to first evaluate a cache cleaner threshold. Once the cache cleaner threshold is reached that indicates a threshold number of status bits are "dirty," the cache cleaner controller then employs the cache cleaner interval to determine if an amount of time specified by the interval has also passed. In this way, the cache cleaner threshold is employed to limit an amount of data stored in the cache storage that is "dirty" (i.e., has been changed), thereby reducing an amount of data to be copied to physical volatile memory when entering a low power mode. The cache cleaner interval is utilized to control a frequency of data transmission between the cache storage and the physical volatile memory. Further discussion of these and other examples, including dynamic overrides of the cache cleaner threshold and cache cleaner interval based on a number of active cores is included in the following descriptions and shown in corresponding figures.

In some aspects, the techniques described herein relate to an apparatus including a cache directory including status bits associated with cache locations within cache storage; and a cache cleaner controller configured to detect that a cache cleaner threshold has been reached, the cache cleaner threshold used to designate that a threshold number of the status bits indicate data maintained at the cache locations, respectively, has been changed and cause the data indicated as changed by the status bits to be copied from the cache locations within cache storage to physical volatile memory.

In some aspects, the techniques described herein relate to an apparatus, wherein the cache cleaner controller is configured to detect the threshold number of the status bits using a cache cleaner counter.

In some aspects, the techniques described herein relate to an apparatus, wherein the cache cleaner counter is set based on tracked state updates to the cache storage.

In some aspects, the techniques described herein relate to an apparatus, wherein the cache cleaner threshold is programmable.

In some aspects, the techniques described herein relate to an apparatus, wherein the cache cleaner threshold is adjustable by the cache cleaner controller based on a number of active cores of a processor unit.

In some aspects, the techniques described herein relate to an apparatus, wherein: the status bits are configured as dirty bits; and the cache directory and the cache cleaner controller are included as part of an integrated circuit of a processor unit.

In some aspects, the techniques described herein relate to an apparatus, wherein the cache cleaner controller is further configured to set the status bits in the cache directory, subsequent to the copy, as unchanged.

In some aspects, the techniques described herein relate to an apparatus, wherein the cache cleaner controller is further configured to detect that a cache cleaner interval has been reached and the copy is configured to be performed in response to detection that the cache cleaner interval has been reached.

In some aspects, the techniques described herein relate to an apparatus, wherein the cache cleaner interval is adjustable by the cache cleaner controller based on a number of active cores of a processor unit.

In some aspects, the techniques described herein relate to an apparatus, wherein the cache cleaner interval is programmable.

In some aspects, the techniques described herein relate to a system including a cache storage, a cache directory, and a cache cleaner controller configured to: detect that a cache cleaner interval has been reached; and cause data that has been changed, as indicated by status bits in the cache directory, to be copied from the cache storage to physical volatile memory.

In some aspects, the techniques described herein relate to a system, wherein the cache cleaner interval is programmable.

In some aspects, the techniques described herein relate to a system, wherein the cache cleaner interval is adjustable by the cache cleaner controller based on a number of active cores of a processor unit.

In some aspects, the techniques described herein relate to a system, wherein the cache cleaner controller is further configured to detect that a threshold number of the status bits indicate the data maintained at cache locations in the cache storage is changed.

In some aspects, the techniques described herein relate to a system, wherein the threshold number of the status bits is defined using a cache cleaner threshold that is programmable.

In some aspects, the techniques described herein relate to a system, wherein the threshold number of the status bits is adjustable by the cache cleaner controller based on a number of active cores of a processor unit.

In some aspects, the techniques described herein relate to a system, wherein the cache cleaner controller is further configured to set the status bits as indicating the data maintained at cache locations in the cache storage is unchanged subsequent to copying of the data from the cache storage to the physical volatile memory.

In some aspects, the techniques described herein relate to a method including detecting, by a cache cleaner controller, that a cache cleaner threshold has been reached, the cache cleaner threshold defining a threshold number of status bits indicating data at corresponding cache locations in cache storage have been changed, detecting, by the cache cleaner controller; that a cache cleaner interval has been reached, the cache cleaner interval specifying an amount of time, and causing, by the cache cleaner controller, data maintained at the cache locations associated with the threshold number of status bits to be copied from the cache storage to physical volatile memory.

In some aspects, the techniques described herein relate to a method, further including setting the status bits of the cache locations corresponding to the threshold number, subsequent to the causing, as indicating that the data is unchanged.

In some aspects, the techniques described herein relate to a method, wherein the causing is performed responsive to the detecting the cache cleaner threshold has been reached and the detecting that the cache cleaner interval has been reached.

Figure 1:
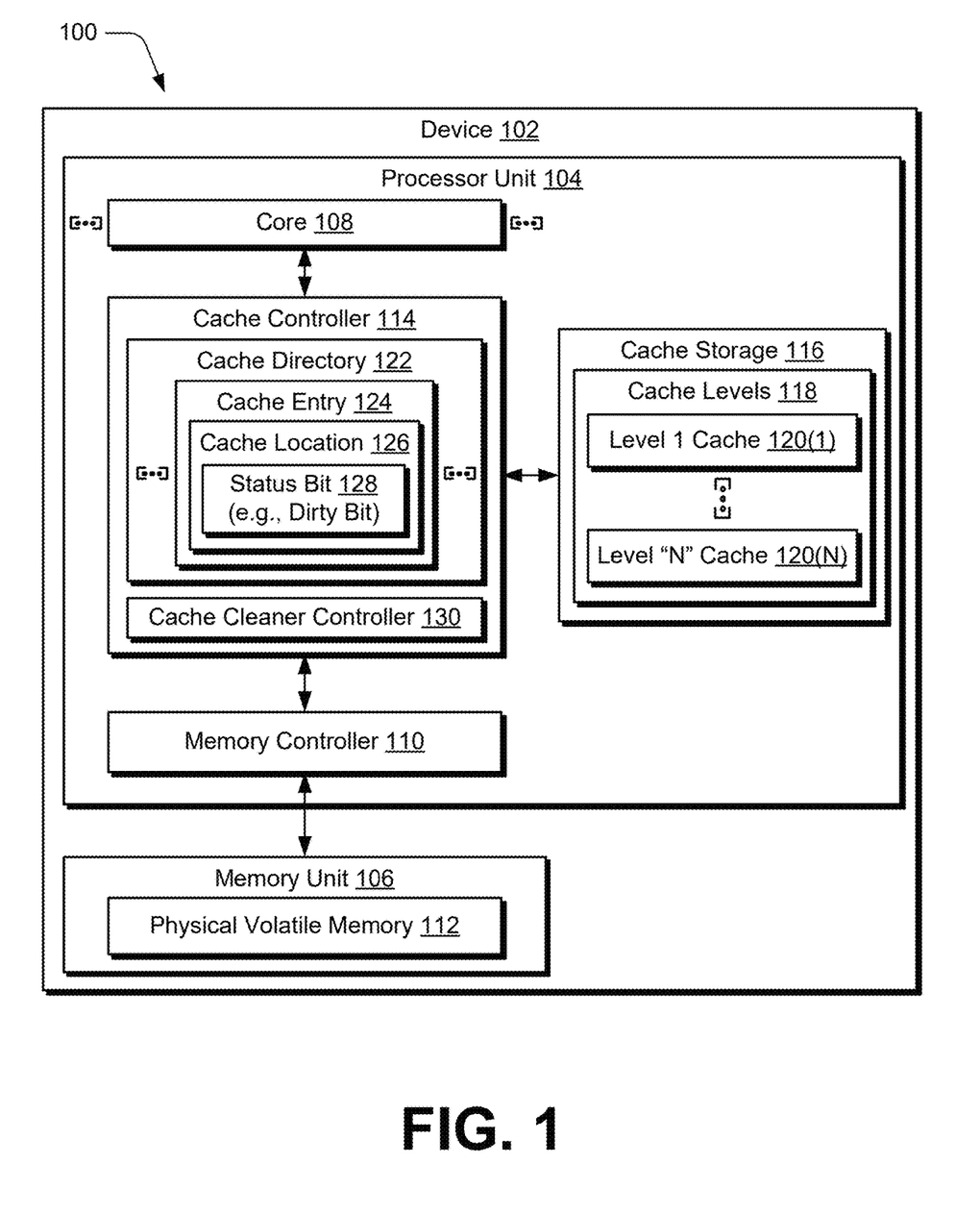
FIG. 1 is a block diagram of a non-limiting example system configured to employ cache cleaner controller techniques.

FIG. 1 is a block diagram of a non-limiting example system 100 configured to employ cache cleaner controller techniques. The system 100 includes a device 102 having a processor unit 104 and a memory unit 106. The processor unit 104 is configured in hardware (e.g., as an integrated circuit) and is communicatively coupled to a memory unit 106, e.g., via a bus system to a printed circuit board that implements the memory unit 106.

The device 102 is configurable in a variety of ways. Examples of which include, by way of example and not limitation, computing devices, servers, mobile devices (e.g., wearables, mobile phones, tablets, laptops), processors (e.g., graphics processing units, central processing units, and accelerators), digital signal processors, disk array controllers, hard disk drive host adapters, memory cards, solid-state drives, wireless communications hardware connections, Ethernet hardware connections, switches, bridges, network interface controllers, and other apparatus configurations. It is to be appreciated that in various implementations, the device 102 is configured as any one or more of those devices listed just above and/or a variety of other devices without departing from the spirit or scope of the described techniques.

The processor unit 104 includes a plurality of cores, an example of which is depicted as core 108. The core 108 is an individual computational unit implemented in hardware of the processor unit 104, e.g., as part of the integrated circuit. The core 108 is configured to execute instructions to perform operations, e.g., through use of control and arithmetic logic units (ALUs). Multiple cores are operable in parallel to implement a variety of functionality.

The processor unit 104 also includes a memory controller 110. The memory controller 110 is configurable in a variety of ways, including in hardware as part of an integrated circuit, as a microcontroller configured to execute software, combinations thereof, and so forth. The memory controller 110 acts as a bridge between the processor unit 104 and the memory unit 106. The memory controller 110 is configurable to implement a variety of functionality, examples of which include address translation, command queuing, support read and write operations (e.g., to physical volatile memory 112 of the memory unit 106), error checking and correlation, memory initialization and configuration, power management, and so forth.

The physical volatile memory 112 is also configurable in a variety of ways, e.g., as "main memory" of the device 102. The memory unit 106, for instance, is configurable as a printed circuit board (PCB) communicatively coupled via a bus on a motherboard to a processor unit 104. Examples of physical volatile memory 112 configurations include implementation as an integrated circuit (e.g., in silicon) and configurable as dynamic random access memory (DRAM), synchronous (DRAM), double data rate SDRAM, and so forth.

The processor unit 104 also includes a cache controller 114 and cache storage 116 as part of a cache system implemented in hardware of the processor unit 104, e.g., as part of a single die of an integrated circuit. The cache controller 114, through use of the cache storage 116 as previously described, is configured to increase efficiency in data access by the core 108 by storing frequently or recently accessed data "on chip" in the cache storage 116. To do so in the illustrated example, the cache storage 116 includes a plurality of cache levels 118, examples of which include a level 1 cache 120(1), . . . , through a level "N" cache 120(N). The different cache levels 118, for instance, are configurable to balance tradeoffs between data access speed and an amount of data that may be stored in the respective cache levels.

To manage this access, the cache controller 114 utilizes a cache directory 122 having a plurality of cache entries 124. The plurality of cache entries 124 reference, respectively, a cache location 126 in the cache storage 116 as corresponding to a location within the physical volatile memory 112 and a status bit 128. The status bit 128, also known as a "dirty bit," is utilized to indicate whether the data maintained at the cache location 126 for the plurality of cache entries 124 has been changed with respect to corresponding data in the physical volatile memory 112. The status bit 128 as set as "dirty," for instance, indicates the data at the cache location 126 in the cache storage 116 has been changed. On the other hand, the status bit 128 as set as "clean" indicates that the data at the cache location 126 in the cache storage 116 has not been changed.

The cache controller 114 is configurable to perform flush operations to "clear out" data from the cache storage 116, e.g., in order to promote coherency of data, support context switches to support use of multiple cores of the processor unit 104, interrupts, and so forth. In order to enter a low power mode of the processor unit 104, for instance, data from the cache storage 116 is "flushed" to the physical volatile memory 112. The cache system (e.g., the cache controller 114 and the cache storage 116) then enter the low power mode to reduce power consumption. In conventional real-world scenarios, for instance, a cache level that is a subject of a flush operation includes approximately forty to fifty percent of overall capacity as marked as "dirty" at any single point in time. Therefore, entry into a low power mode in such scenarios may consume a significant amount of time and latency, e.g., one-hundred and fifty to two-hundred and fifth microseconds for a level three cache.

To address these technical challenges, the cache controller 114 includes a cache cleaner controller 130. The cache cleaner controller 130 is configurable in a variety of ways, example of which include hardware of the processor unit 104 (e.g., "on die" as part of an integrated circuit), through use of a microcontroller configured to execute software to perform operations, and so forth. The cache cleaner controller 130 is implemented in these examples to control amounts of data in the cache storage 116 that are indicated as changed (e.g., "dirty") by the cache directory 122, control when coherency control techniques are implemented to harmonize data stored in the cache storage 116 with data stored in the physical volatile memory 112, and so forth.

Figure 2:
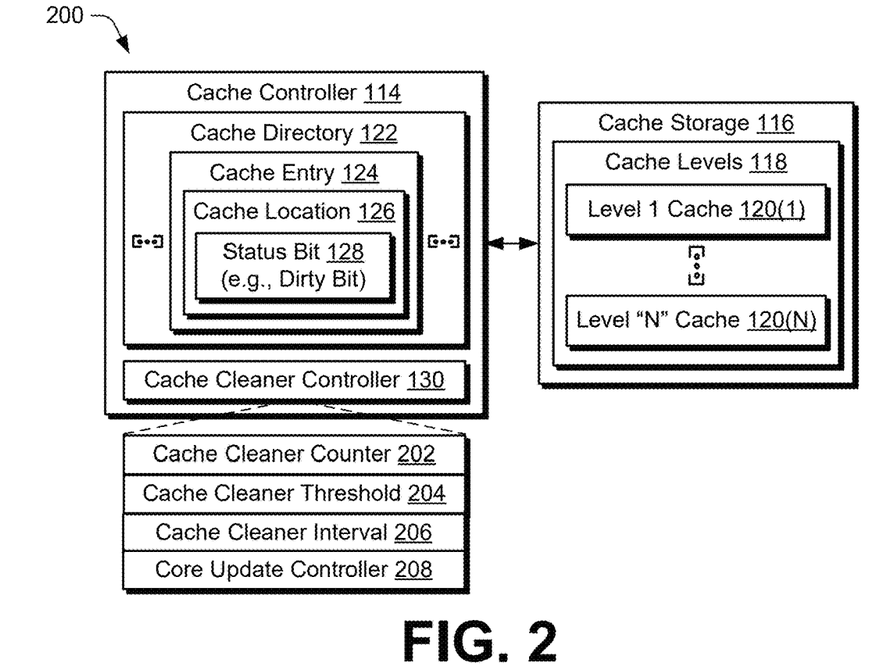
FIG. 2 is a block diagram of a non-limiting example cache system showing operation of a cache cleaner controller of FIG. 1 in greater detail.

FIG. 2 is a block diagram of a non-limiting example cache system 200 showing operation of a cache cleaner controller 130 of FIG. 1 in greater detail. The cache system 200 include a cache controller 114 and cache storage 116 as described above. The cache cleaner controller 130 is configured to manage an amount of data in the cache storage 116 that, at any one time, is "dirty," i.e., is changed with respect to data maintained in the physical volatile memory 112 and thus is subject to copying over to physical volatile memory 112, e.g., to maintain cache coherency between the cache storage 116 and the physical volatile memory 112. In this way, the cache cleaner controller 130 is configured to limit an amount of data from the cache storage 116 that is to be copied over to physical volatile memory 112 upon entry into a low power mode. To do so, the cache cleaner controller 130 employs a cache cleaner counter 202, a cache cleaner threshold 204, a cache cleaner interval 206, and a core update controller 208.

The cache cleaner counter 202 is configurable to define a current state of status bits 128 that indicate that changes have been made to corresponding data maintained at cache locations 126 in the cache storage 116. The cache cleaner threshold 204 is configured to define a threshold amount of status bits 128 that indicate a change (e.g., are "dirty"), a value of which is programmable. The cache cleaner interval 206 specifies an amount of time that is to pass in order to clean the dirty data in the cache storage 116 as indicated by the status bit 128. The core update controller 208 is configured to update the cache cleaner threshold 204 and/or the cache cleaner interval 206 based on a number of cores 108 that are active in the processor unit 104.

Figure 3:
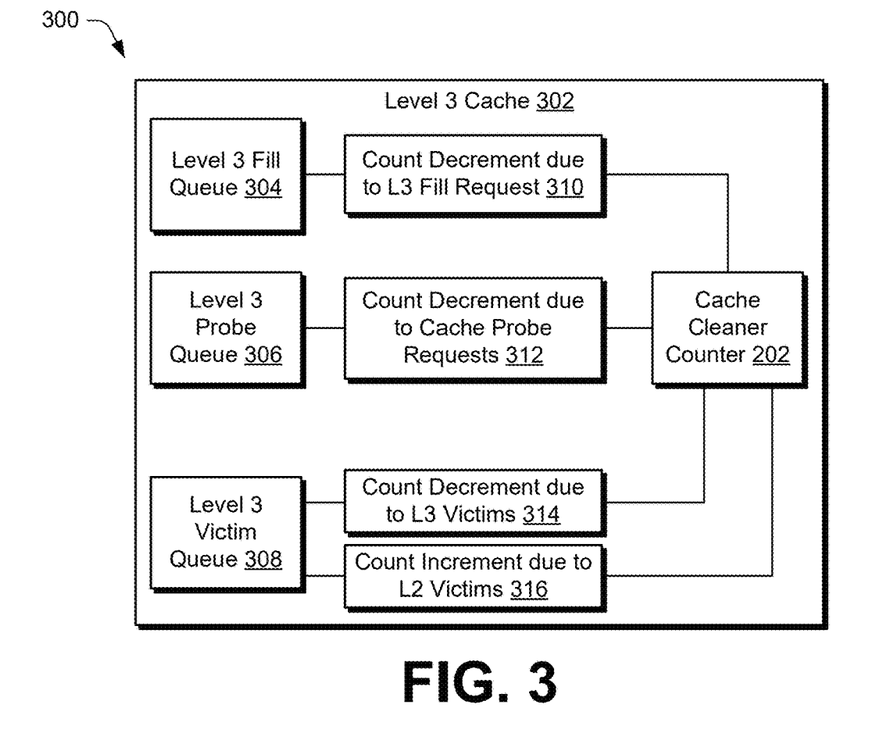
FIG. 3 is a block diagram of a non-limiting example system showing operation of a cache cleaner counter of FIG. 2 in greater detail in conjunction with a level 3 cache.

The cache cleaner counter 202, for instance, is creatable by the cache cleaner controller 130 to track accesses to data in the cache storage 116 and track a number of accesses that result in a change to the data in comparison to the data maintained in the physical volatile memory 112 as further described in relation to FIG. 3. The cache cleaner controller 130 is configurable to monitor the cache cleaner counter 202 and compare a value of the cache cleaner counter 202 with the cache cleaner threshold 204. Upon reaching the cache cleaner threshold 204, the cache cleaner controller 130 then determines whether a cache cleaner interval 206 has been reached, which specifies an amount of time to wait between transmissions between the cache storage 116 and the physical volatile memory 112 by the cache cleaner controller 130.

When both conditions are met in this example, the cache cleaner controller 130 "cleanses" the status bits 128 indicating changed data, i.e., is dirty. The cache cleaner controller 130, for instance, transmits the data associated with cache entries 124 having status bits 128 that are marked "dirty" from corresponding cache locations 126 of the cache storage 116 to the physical volatile memory 112. Once transmitted and copied by the physical volatile memory 112, the data at the cache location 126 in the cache storage 116 is therefore "clean," and the status bit status bit 128 is reset to "clean," i.e., unchanged. The data at the cache location 126 in the cache storage 116, however, remains available for subsequent operations, thereby preserving data access efficiencies. Further, by marking the status bit 128 as "clean," a subsequent flush operation (e.g., as part of powering down the cache system 200) does not involve transmission and copying of this data, thereby improving latency during power down of the device 102 as well as increased efficiency in performing the subsequent operation.

FIG. 3 is a block diagram of a non-limiting example system 300 showing operation of a cache cleaner counter 202 of FIG. 2 in greater detail in conjunction with a level 3 cache. The level 3 cache 302 in this example includes a level 3 fill queue 304, a level 3 probe queue 306, and a level 3 victim queue 308. The cache cleaner counter 202 is configured to track level 3 state updates through shared core and system program requests which include core fill requests that hit the level 3 cache 302, level 2/level three victims/writes, and system probe requests. The core fill requests are handled through the fill queue 304, probes are handled through the level 3 probe queue 306, the writes/victims are handled through the level 3 victim queue 308.

Based on coherent state transitions each queue as illustrated in FIG. 3 generates cache cleaner counter 202 increment or decrement events. The following chart includes examples of cache state transitions and corresponding use of increment or decrement events to adjust the cache cleaner counter 202.

| Cache Request Type | Previous State | Next State | Counter Next State |
|---|---|---|---|
| L2 Load | Shared Dirty | Shared Clean | Decrement |
| L2 Load | Exclusive Dirty | Invalid | Decrement |
| L2 Load Exclusive | Shared or Exclusive Dirty | Invalid | Decrement |
| L2 → L3 victims upgrades, L3 Capacity/Collision Victims, L3 Flush | Exclusive Dirty: Shared Dirty | Exclusive or Invalid: Shared Clean or Invalid | Decrement |
| Probe/Snoop event, e.g., invaliding, clean, migratory, share | Shared or Exclusive Dirty | Shared Clean or Invalid | Decrement |
| L2 Victims | Invalid | Shared or Exclusive Dirty | Increment |

In the illustrated example, a count decrement due to a L3 fill request 310 is performed to the cache cleaner counter 202 based on a fill request to the level 3 fill queue 304. A count decrement due to a cache probe request 312 is performed to the cache cleaner counter 202 to a cache probe request to the level 3 probe queue. A count decrement due to L2 victims 314 is performed to the cache cleaner counter 202 whereas a count increment due to L2 victims 316 is performed to the cache cleaner counter 202 based on the level 3 victim queue 308.

Figure 4:
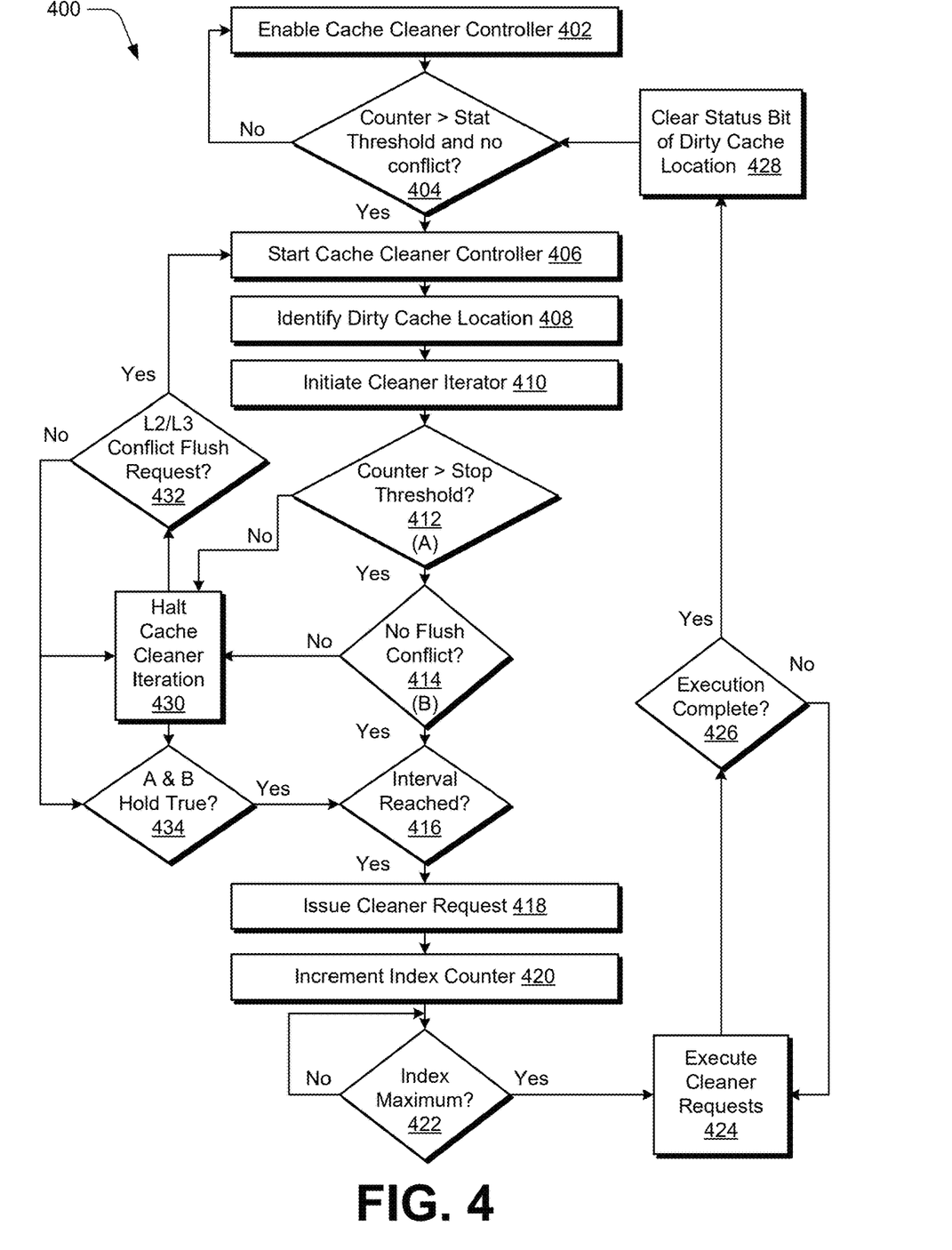
FIG. 4 is a flow diagram depicting an algorithm as a step-by-step procedure in an example implementation of operations performable for accomplishing a result of cleansing dirty bits in a cache directory and causing coherence of data maintained in cache storage with data maintained in a physical nonvolatile memory.

FIG. 4 is a flow diagram depicting an algorithm as a step-by-step procedure 400 in an example implementation of operations performable for accomplishing a result of cleansing dirty bits in a cache directory and causing coherence of data maintained in cache storage with data maintained in a physical nonvolatile memory.

The following discussion describes techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

In this example, the cache cleaner controller 130 "cleans" cache locations (e.g., cache lines) based on a programmable interval as defined by the cache cleaner interval 206, which is performable in an absence of regular flush traffic to the level 3 cache 302. The cache cleaner interval 206 is employed, for instance, to avoid excessive interface to demand requests which could have a potential effect on operation of the cache system 200. Additionally, the cache cleaner threshold 204 is employed to ensure that the data maintained in the cache storage 116 does not get "too dirty" in a manner that could affect other operations, e.g., entry into a low power mode as previously described.

Accordingly, the cache cleaner threshold 204 is used to start and stop operation of the cache cleaner controller 130 to "clean" data corresponding to dirty bits of the cache directory 122. The cache cleaner interval 206 defines an interval, at which, to permit this operation, e.g., every programmable "N" cycles. In an implementation, the cache cleaner controller 130 supports eight-bit interval count, although other granularities are also supported, e.g., sixteen cycle granularities. The cache cleaner threshold 204 also supports ten-bit threshold count with thirty two cache dirty line granularity, e.g., for a total of two hundred and fifty six dirty lines for eight distributed level three caches as further described in relation to FIG. 5.

Generally, in the procedure 400 of FIG. 4, a configuration bit is set to enable operation of the cache cleaner controller 130 (block 402) and the cache cleaner counter 202 is greater than the cache cleaner threshold 204 and there is no conflicting flush traffic ("yes" from decision block 404). In response, operation of the cache cleaner controller 130 is initiated (block 406).

The cache cleaner controller 130 identifies a dirty cache location (block 408) based on a status bit 128, e.g., is marked "dirty." A cleaner iterator is initiated (block 410) to cleanse the associated data and the status bit 128. To do so, the cache cleaner controller 130 determines whether the cache cleaner counter 202 is greater than a stop threshold (decision block 412) and no flush conflict (decision block 414) is detected. If so, a determination is then made by the cache cleaner controller 130 as to whether the cache cleaner interval 206 has been reached (decision block 416). If each of these conditions is true ("yes" from decision blocks 412, 414, 416) a cleaner request is issued by the cache cleaner controller 130 (block 418).

The cache cleaner controller 130 is configured in this example to batch the cleaner requests. To do so, an index counter is incremented (block 420) for each issued cleaner request. A determination is then made by the cache cleaner controller 130 as to whether the index maximum is reached (decision block 422). If so ("yes" from decision block 422), the cleaner requests are executed (block 424). To do so, data from the cache locations in the cache location 126 is transmitted for receipt by the physical volatile memory 112. The physical volatile memory 112 copies the data at a corresponding memory location such that data maintained at the cache storage 116 is coherent with and matches the data maintained in the physical volatile memory 112. Once execution is complete ("yes" from decision block 426), the status bit of the dirty cache location is cleared (block 428), i.e., set to "clean" and the procedure returns to decision block 404.

In the illustrated example, if the counter is not greater than the stop threshold ("no" from decision block 412) or the is a flush conflict ("no" from decision block 414), the cache cleaner iteration is halted (block 430). A determination is then made as to whether there is a L2/L3 conflicting flush request (decision block 432). If so ("yes" from decision block 432), the procedure 400 returns to block 406 to restart the cache cleaner controller. If not ("no" from decision block 432), a determination is made again (decision block 434) as to whether the counter is greater than the stop threshold (decision block 412) and that there is no flush conflict (block 414). If so ("yes" from decision block 412 and decision block 414), a determination is made as to whether the interval has been reached (decision block 416) for the cache cleaner interval 206 as previously described.

Returning again to FIG. 2, a core update controller 208 is also usable to update a cache cleaner threshold 204 and/or a cache cleaner interval 206 based on a number of active cores. The core update controller 208, for instance, is configurable to increase efficiency of cache storage 116 and cache directory 122 cleansing in response to a number of active cores 108 of the processor unit 104. When entering a low power mode, for instance, a number of active cores is reduced as going into a sleep state. Accordingly, when a number of active cores is relatively high, there is a greater likelihood of interference caused by traffic to the physical volatile memory 112 with the cleanse operations above.

Accordingly, the core update controller 208 is implemented in this example to dynamically configure the cache cleaner threshold 204 and/or the cache cleaner interval 206, an example of which is described in the following table.

| Cleanse Preselect Config | Number of Active Cores | Cache cleaner threshold or cache cleaner interval | Comments |
| --- | --- | --- | --- |
| 2'd0 | X | NA | |
| 2'd1 | ≥2 | NA | |
| 2'd1 | 1 | Reduce by ½ | |
| 2'd1 | 0 | Reduce by ¼ | Disable Cleanse on low power entry |
| 2'd2 | ≥4 | NA | |
| 2'd2 | 2 | Reduce by ½ | |
| 2'd2 | 1 | Reduce by ¼ | |
| 2'd2 | 0 | Reduce by ⅛ | Disable Cleanse on low power entry |
| 2'd3 | ≥4 | Reduce by ½ | |
| 2'd3 | 2 | Reduce by ¼ | |
| 2'd3 | 1 | Reduce by ⅛ | |
| 2'd3 | 0 | Reduce by 1/16 | Disable Cleanse on low power entry |

Accordingly, when presets for the cache cleaner threshold 204 and/or the cache cleaner interval 206 are enabled, the cache cleaner controller 130 reduces the cache cleaner threshold 204 and/or the cache cleaner interval 206 based on a number of active cores.

Figure 5:
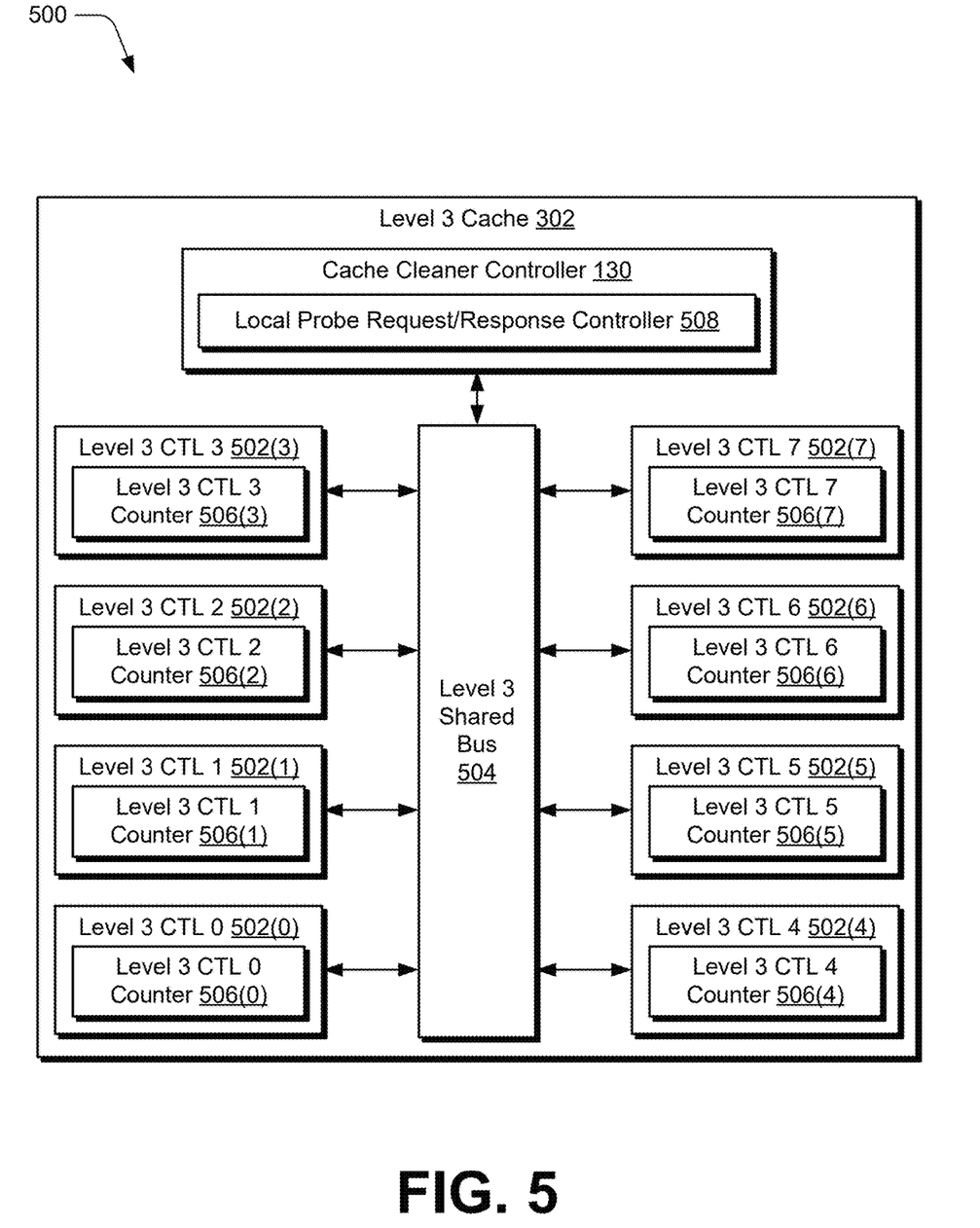
FIG. 5 is a block diagram of a non-limiting example system showing operation of cache cleaner controller of FIG. 2 in greater detail as a distributed controller within a level 3 cache.

FIG. 5 is a block diagram of a non-limiting example system 500 showing operation of cache cleaner controller 130 of FIG. 2 in greater detail as a distributed controller within a level 3 cache. The level 3 cache 302 includes a plurality of distributed level three controllers, examples of which are illustrated as a level 3 CTL 0 502(0), level 3 CTL 1 502(1), level 3 CTL 2 502(2), level 3 CTL 3 502(3), level 3 CTL 4 502(4), level 3 CTL 5 502(5), level 3 CTL 6 502(6), and level 3 CTL 7 502(7). The plurality of distributed level three controllers is communicatively coupled via a level 3 shared bus 504 with the cache cleaner controller 130.

Each of the distributed level three controllers includes a respective cache cleaner counter 202, examples of which are illustrated a level 3 CTL 0 counter 506(0), a level 3 CTL 1 counter 506(1), a level 3 CTL 2 counter 506(2), a level 3

CTL 3 counter 506(3), a level 3 CTL 4 counter 506(4), a level 3 CTL 5 counter 506(5), a level 3 CTL 6 counter 506(6), and a level 3 CTL 7 counter 506(7). A local probe request/response controller 508 is implemented as part of the cache cleaner controller 130 to obtain values from the respective counters in order to arrive at an overall count of changed data (e.g., dirty bits) by the cache cleaner counter 202. A variety of other examples are also contemplated.

Figure 6:
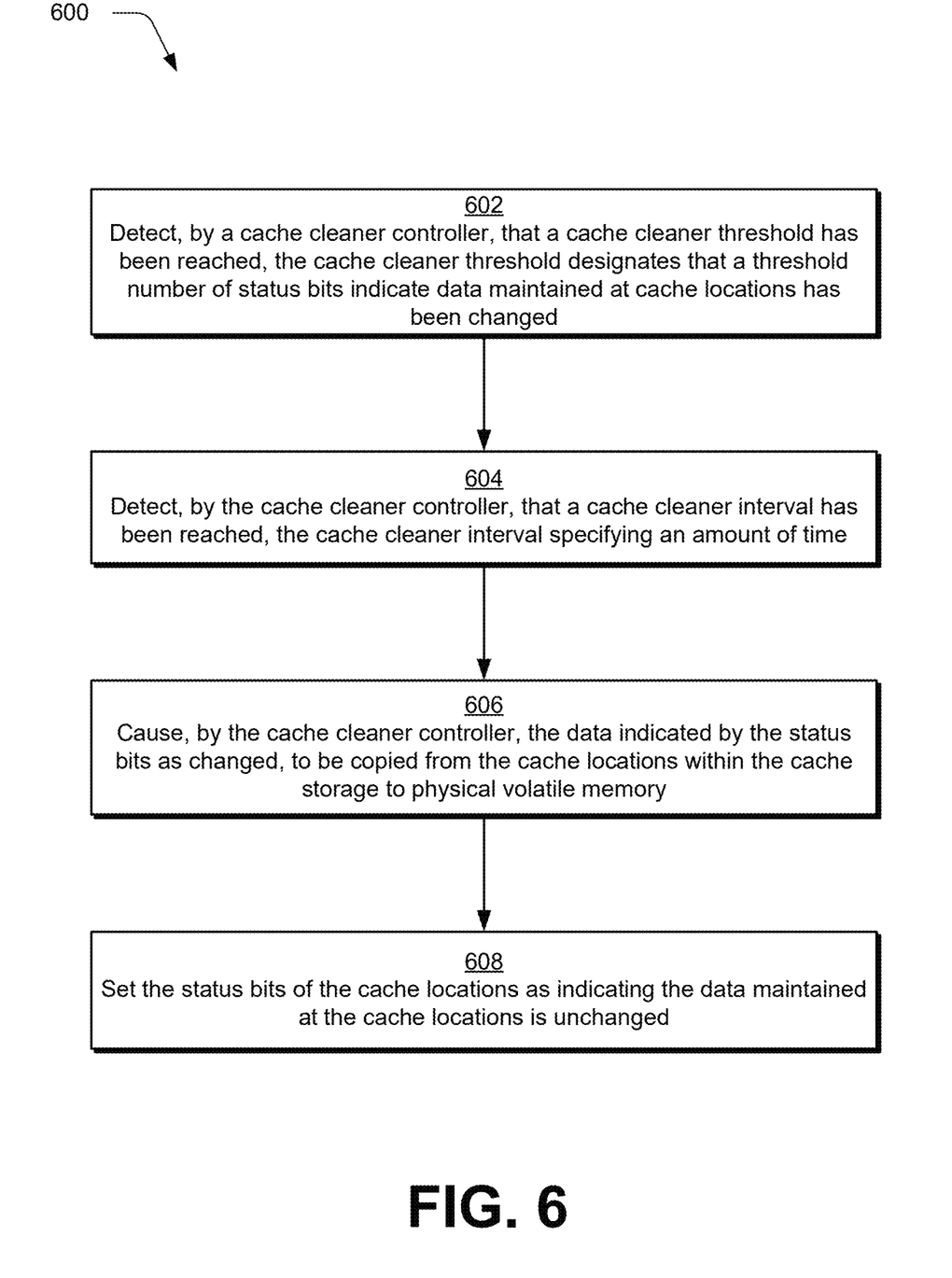
FIG. 6 is a flow diagram depicting an algorithm as a step-by-step procedure in an example implementation of operations performable for accomplishing a result of cleansing dirty bits in a cache directory through use of a cache cleaner threshold and a cache cleaner interval by a cache cleaner controller.

FIG. 6 is a flow diagram depicting an algorithm 600 as a step-by-step procedure in an example implementation of operations performable for accomplishing a result of cleansing dirty bits in a cache directory through use of a cache cleaner threshold and a cache cleaner interval by a cache cleaner controller.

The following discussion describes techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

In one or more examples, a cache cleaner controller detects that a cache cleaner threshold has been reached. The cache cleaner threshold designates that a threshold number of status bits indicate data maintained at cache locations has been changed (block 602).

The cache cleaner controller also detects that a cache cleaner interval has been reached. The cache cleaner interval specifying an amount of time (block 604), e.g., as a number of processor cycles. The cache controller causes the data, indicated by the status bits as changed, to be copied from the cache locations within the cache storage to physical volatile memory (block 606).

The status bits of the cache location corresponding to the threshold number are set, subsequent to the causing, as indicating the data maintained at the cache locations is unchanged (block 608).

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the device 102 having the core 108, the cache controller 114, the cache storage 116, and the memory unit 106 having the physical volatile memory 112) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processor unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. An apparatus comprising:
 a cache directory including status bits associated with cache locations within cache storage; and
 a cache cleaner controller configured to:
  detect that a cache cleaner threshold has been reached, the cache cleaner threshold designating that a threshold number of the status bits indicate data maintained at the cache locations, respectively, has been changed, wherein the cache cleaner threshold is adjustable by the cache cleaner controller based on a number of active cores of a processor unit; and
  cause the data, indicated by the status bits as changed, to be copied from the cache locations within the cache storage to physical volatile memory.

2. The apparatus of claim 1, wherein the cache cleaner controller is configured to detect the threshold number of the status bits using a cache cleaner counter.

3. The apparatus of claim 2, wherein the cache cleaner counter is set based on tracked state updates to the cache storage.

4. The apparatus of claim 1, wherein the cache cleaner threshold is programmable.

5. The apparatus of claim 1, wherein:
 the status bits indicating the change are dirty bits; and
 the cache directory and the cache cleaner controller are included as part of an integrated circuit of the processor unit.

6. The apparatus of claim 1, wherein the cache cleaner controller is further configured to set the status bits in the cache directory, subsequent to the copy of the data from the cache storage to the physical volatile memory, as unchanged.

7. The apparatus of claim 1, wherein the cache cleaner controller is further configured to detect that a cache cleaner interval has been reached and the copy is configured to be performed in response to detection that the cache cleaner interval has been reached.

8. The apparatus of claim 7, wherein the cache cleaner interval is adjustable by the cache cleaner controller based on a number of active cores of a processor unit.

9. The apparatus of claim 7, wherein the cache cleaner interval is programmable.

10. The apparatus of claim 1, wherein the cache cleaner controller is configured to reduce the cache cleaner threshold when the number of active cores is reduced.

11. A system comprising:
a cache storage;
a cache directory; and
a cache cleaner controller configured to:
  detect that a cache cleaner interval has been reached, the cache cleaner interval specifying an amount of time between successive flush operations of the cache storage; and
  cause data that has been changed, as indicated by status bits in the cache directory, to be copied from the cache storage to physical volatile memory.

12. The system of claim 11, wherein the cache cleaner interval is programmable.

13. The system of claim 11, wherein the cache cleaner interval is adjustable by the cache cleaner controller based on a number of active cores of a processor unit.

14. The system of claim 11, wherein the cache cleaner controller is further configured to detect that a threshold number of the status bits indicate the data maintained at cache locations in the cache storage is changed.

15. The system of claim 14, wherein the threshold number of the status bits is defined using a cache cleaner threshold that is programmable.

16. The system of claim 14, wherein the threshold number of the status bits is adjustable by the cache cleaner controller based on a number of active cores of a processor unit.

17. The system of claim 11, wherein the cache cleaner controller is further configured to set the status bits as indicating the data maintained at cache locations in the cache storage is unchanged subsequent to copying of the data from the cache storage to the physical volatile memory.

18. A method comprising:
  detecting, by a cache cleaner controller, that a cache cleaner threshold has been reached, the cache cleaner threshold defining a threshold number of status bits indicating data at corresponding cache locations in cache storage have been changed;
  detecting, by the cache cleaner controller; that a cache cleaner interval has been reached, the cache cleaner interval specifying an amount of time between successive flush operations of the cache storage; and
  causing, by the cache cleaner controller, data maintained at the cache locations associated with the threshold number of status bits to be copied from the cache storage to physical volatile memory.

19. The method of claim 18, further comprising setting the status bits of the cache locations corresponding to the threshold number, subsequent to the causing the data maintained at the cache locations associated with the threshold number of status bits to be copied from the cache storage to physical volatile memory, as indicating that the data is unchanged.

20. The method of claim 18, wherein the causing is performed responsive to the detecting the cache cleaner threshold has been reached and the detecting that the cache cleaner interval has been reached.

* * * * *